United States Patent [19]

Harrison

[11] Patent Number: 4,733,756
[45] Date of Patent: Mar. 29, 1988

[54] BRAKE ADJUSTERS
[75] Inventor: Anthony W. Harrison, Birmingham, England
[73] Assignee: Lucas Industries, Birmingham, England
[21] Appl. No.: 894,837
[22] Filed: Aug. 8, 1986
[30] Foreign Application Priority Data Aug. 13, 1985 [GB] United Kingdom ................ 8520282

[51] Int. Cl.⁴ ..................... F16D 55/08; F16D 65/56
[52] U.S. Cl. .................................. 188/170; 188/71.9; 188/196 A
[58] Field of Search .................. 188/71.8, 71.9, 12.3, 188/72.4, 170, 196 A, 196 BA; 192/111 A; 92/13.7, 13.8

[56] References Cited
U.S. PATENT DOCUMENTS
2,554,065 5/1951 Shields ...................... 188/196 A X Primary Examiner—Duane A. Reger
Attorney, Agent, or Firm—Scrivener and Clarke

[57] ABSTRACT

The present invention provides a brake actuation and adjuster system comprising means for applying brake actuation pressure both to a brake actuator member and to a pump. The pump is arranged to pump pressure fluid to an adjuster control valve and an adjuster actuator, and the brake actuator member is arranged to be moved by said brake actuation pressure to then open the adjuster control valve against the pressure of the pressure fluid after the brake actuator has moved to a predetermined release position. Thus, in one embodiment, brake actuation pressure primes the pump causing the pump to force pressure fluid to the adjuster actuator. If adjustment is necessary, it is effected until the adjuster control valve is opened to release the pressure fluid. Thus a simple, independent adjuster arrangement is provided which does not affect available brake performance.

10 Claims, 4 Drawing Figures

Fig_1

BRAKE ADJUSTERS

DESCRIPTION

The present invention relates to a brake actuation and adjuster system.

Most known brake lining wear adjusters rely on using some of the brake actuator force or some of the brake return spring force, to provide energy for operating the adjuster, the brake actuator force and the return spring force operating in opposite directions, with one force being used to apply the brakes and the other force being used to release the brakes. Adjuster operation either increases the threshold brake application force below which there is zero or a much reduced braking effect, or dirctly reduces the braking effect by an indeterminate amount which depends upon adjuster friction and whether or not adjustment is required on that particular brake application. Proper balance of brake distribution on the vehicle wheels can therefore be degraded and adhesion utilization lost. This problem thus provides a strong incentive to design adjusters which need as little energy as possible to drive them. The designer is therefore always faced with a compromise where the consistency of low demand brake performance is set against adjuster reliability.

The aim of the present invention is to provide a brake actuation and adjuster system wherein energy for adjuster operation is taken from the brake actuation system, without affecting the brake application force.

According to the present invention there is provided a brake actuation and adjuster system comprising means for applying brake actuation pressure both to a brake actuator member and to a pump, the pump being arranged to pump pressure fluid to an adjuster control valve and an adjuster actuator, and the brake actuator member being arranged to be moved by said brake actuation pressure, and to open the adjuster control valve against the pressure of said pressure fluid, after the brake actuator has moved to a predetermined release position.

In one embodiment of the present invention the brakes are applied by a main spring and released by the brake actuation pressure. Whilst the brake actuation pressure may be provided mechanically, hydraulically or pneumatically, it is preferred to operate the system hydraulically. Further, while the said pressure fluid may be air or hydraulic fluid, hydraulic fluid is preferred. Besides eventually moving the brake actuator member to release the brakes via a mechanical linkage, the brake actuation pressure also moves a piston in the pump, against a spring. This movement of the pump piston forces pressure fluid along pressure lines from the pump to the adjuster control valve and the adjuster actuator.

As the brake actuation pressure increases from zero to a value at which it begins to overcome the main spring, so the pump applies pressure both in the adjuster control valve to hold it closed, and in the adjuster actuator. While the pressure in the adjuster actuator tries to operate the adjuster actuator, the frictional forces between the brake lining and braking surface, produced by the clamp force exerted by the main spring, prevent the adjuster actuator from operating to move the brake lining. As the actuator member moves to slowly release the brake, so the clamp force reduces. Provided the adjuster control valve remains closed, the clamp force will reduce to a value which is less than the force produced by the pressure in the adjuster acutator, and so the adjuster actuator will move and adjust the brake lining position to take account of wear. However, the actuator member is arranged to open the adjuster control valve when it attains a position where brake clearance is required. Thus, with negligible brake lining wear the adjuster control valve is opened by the actuator member before the clamp force reduces to a value which allows the adjuster actuator to operate. The pressure in the adjuster actuator is therefore dumped or relieved to exhaust before it can operate the adjuster actuator. In the event of accumulated brake lining wear, the clamp force reduces earlier in the movement of the actuator member under actuation pressure, and thus the adjuster actuator can operate to provide an adjustment, before the adjuster control valve is opened. When the actuation pressure is released, the pump spring forces the piston in the pump backwards, to thus draw further pressure fluid into the pump from a reservoir; one-way valves in the inlet and outlet of the pump producing the required direction of fluid flow. By repeatedly applying actuation pressure, incremental adjustments may be made to take up the lining wear.

A flow restrictor is preferably located between the pump and the adjuster control valve and the adjuster actuator. This restrictor both protects the pressure fluid supply system from a sudden flow demand when the adjuster control valve opens, and also ensures a smart drop in adjuster actuator pressure the instant the adjuster control valve opens - making the decision to adjust, more precise. If the actuator member is moved hydraulically, the flow restrictor can alternatively be situated upstream of the pump in the actuation circuit.

The pressure fluid exhausted through the adjuster control valve may be fed directly back to a reservoir or may be first used to lubricate the working parts of the brake.

In a further embodiment of the present invention the brakes are applied by the actuation pressure, an increase in the actuation pressure thus causing an increase in the brake clamp force. In this embodiment the pump is arranged so that the pressure fluid delivery to the adjuster actuator and the adjuster control valve, occurs when the actuation pressure is falling—that is, the delivery is caused by an expansion of the pump spring. Thus any brake application where the brake pressure can overcome the pump spring preload, will cause a pump suction stroke. On release of the brakes, the potential adjuster drive force provided by the pump spring is balanced against the adjuster resistance caused by the brake clamp force. Normally, the adjuster control valve is pushed open by the actuator member before the adjuster resistance has fallen below the adjuster drive force. The adjuster drive pressure is thereby dumped or exhausted before any adjuster movement occurs. Accumulated lining wear causes the brake clamp force to die down earlier in the brake actuator return stroke so that the adjuster drive force can cause an incremental adjustment before the adjuster control valve opens. Repetition of this action restores the normal condition.

Thus in both of the above embodiments the adjuster operates solely on the release of the brakes so that the maximum available force is used solely for braking.

The present invention will now be further described, by way of example, with reference to the accompanying drawings, in which.

Figure 1:
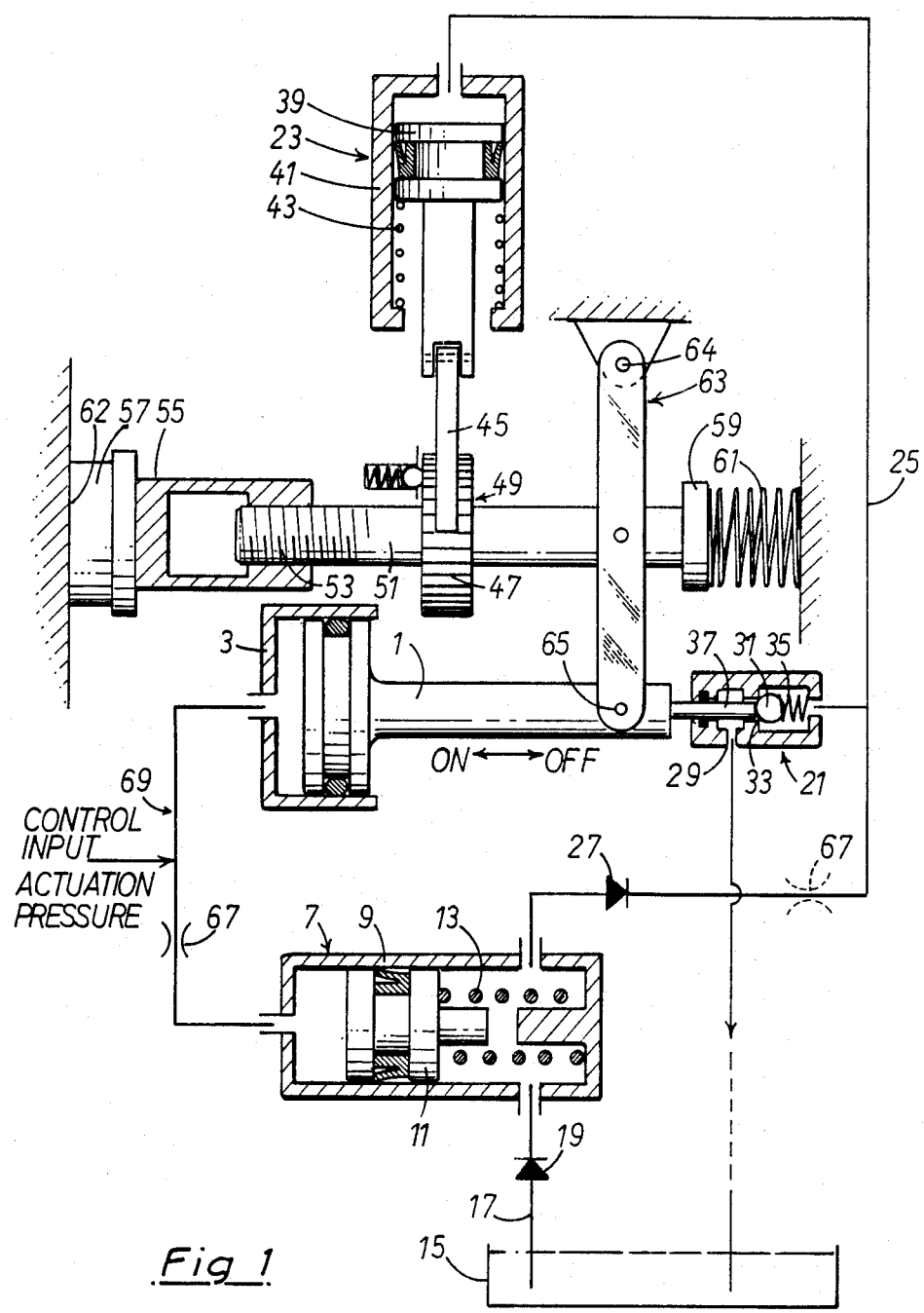
FIG. 1 is a schematic illustration of one embodiment of a brake actuation and adjuster mechanism constructed according to the present invention.

The embodiment of the present invention schematically illustrated in FIG. 1 of the accompanying drawings comprises an actuator member 1 which is movable axially by a piston and cylinder arrangement 3 to which actuation pressure can be hydraulically applied. The actuation pressure is also applied hydraulically to a pump 7. Alternatively the actuation pressure can be applied mechanically or pneumatically.

The pump 7 comprises a housing 9 within which a piston 11 can be moved axially against a spring 13, by the hydraulic actuation pressure. The pump housing 9 connects both with a reservoir 15 of pressure fluid, via a pressure line 17 in which a one-way valve 19 is located, and with an adjuster control valve 21 and an adjuster actuator 23 via a pressure line 25 on which a further one-way valve 27 is located. By virtue of the one-way valves 19, 27 movement of the piston 11 against the spring 13 will force pressure fluid from within the housing 9 along the pressure line 25 to the adjuster control valve 21 and the adjuster actuator 23. Movement of the piston 11 away from the spring 13 will draw pressure fluid from the reservoir 15 into the housing 9.

The adjuster control valve 21 is a ball valve with an outlet 29 which is connected to the reservoir 15. The ball 31 of the ball valve can be lifted off valve seat 33 against the closing force of spring 35 and the pressure in pressure line 25, by an axial extension 37 of the actuator member 1, the pressure in pressure line 25 being then dumped.

The adjuster actuator 23 commprises a piston 39 and cylinder 41, the piston 39 being movable in the cylinder 41 against a spring 43 under the action of the pressure in pressure line 25. The piston 39 has an axial extension 45 which forms a pawl 45, the pawl 45 engaging with a ratchet 47 formed on the periphery of a wheel 49 fixed on a rotatable shaft 51. The rotatable shaft 51 is formed with an adjuster screw 53 at one end region, the adjuster screw 53 being screw-threadedly engaged with a shoe 55 supporting a friction lining 57. The other end 59 of the rotatable shaft 51 is engaged by a main spring 61 which normally applies the friction lining 57 to the braking surface 62. This other end 59 of the rotatable shaft is also pivotally attached to a mid region of a linkage lever 63, one end of the lever 63 being pivotally secured to a fixed point 64 and the other end 65 being pivotally secured to the actuator member 1.

Figure 2:
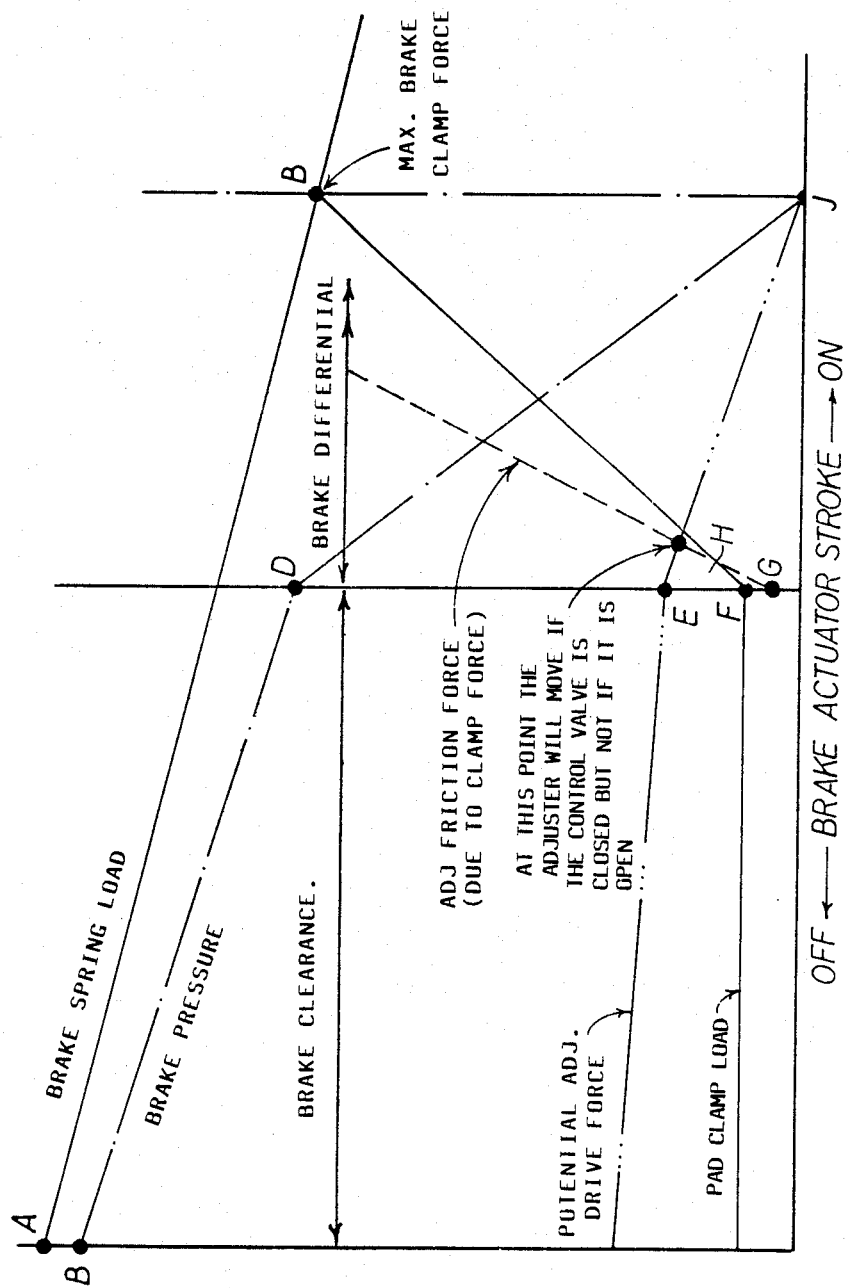
FIG. 2 is a graphical illustration of the operating characteristics of the embodiment of FIG. 1.

In use, the brake lining 57 is normally held against the braking surface 62 by main spring 61, and is released by the application of hydraulic actuation pressure on actuator member 1 by the piston and cylinder arrangement 3; axial movement of the actuator member 1 moving rotatable shaft 51 axially, via linkage lever 63. As the actuation pressure increases from zero (point J—FIG. 2) towards a value at which it begins to overcome the main spring 61 and lift the friction lining 57 clear of the braking surface 62 (Point D—FIG. 2), so the pump 7 applies pressure both in the adjuster control valve 21 and the adjuster actuator 23. This pressure holds the adjuster control valve 21 closed, and tries to move the piston 39 of the adjuster actuator 23. However, the frictional forces (line G-H etc., in FIG. 2) between the brake lining 57 and the braking surface 62, produced by the clamp force (line B-F in FIG. 2), exerted by the force of the main spring 61, prevent the piston 39 in the adjuster actuator 23, from moving. Thus adjustment is not possible.

As the actuator member 1 moves to slowly release the brake, so the clamp force (B to F) reduces. Provided the adjuster control valve 21 remains closed, the clamp force will reduce to a value which is less than the drive force (J to E) produced by the pressure in the adjuster actuator 23, and so the piston 39 will be able to move in the cylinder 41, causing pawl 45 to move the ratchet 47. This ratchet movement rotates shaft 51 causing the adjuster screw 53 to rotate and thus adjust the position of the shoe 55 and lining 57. However, the actuator member 1 has an axial extension 37 which normally lifts the ball 31 off valve seat 33 shortly before the actuator member 1 attains a position wherein the lining 57 is lifted clear of the braking surface 65. Thus with negligible brake lining wear the adjuster control valve 21 is opened by the actuator member 1 before the clamp force (B-G) reduces to a value which allows the adjuster actuator 23 to operate. The pressure in the adjuster actuator 23 is therefore dumped before it can move the piston 39. In the event of an accumulated amount of brake lining wear, the clamp force (B-G) reduces earlier in the movement of the actuator member 1 under actuation pressure, and thus the adjuster actuator 23 can operate to provide an adjustment, before the adjuster control valve is opened. When the actuation pressure is released, the pump spring 13 forces the piston 11 in the pump backwards, drawing in pressure fluid from the reservoir 15 via pressure line 17. By repeatedly applying actuation pressure, incremental adjustments can be made to take up lining wear.

A flow restrictor 67 is located in the hydraulic actuation circuit 69 of the pump 7. This restrictor 57 both protects the pressure fluid supply system to the pump 7 and the piston and cylinder arrangement 3, from any sudden flow demand when the adjuster control valve 21 opens, and also ensures a smart drop in adjuster actuator pressure the instant the adjuster control valve 21 opens—making the decision to adjust, more precise.

Alternatively, the flow restrictor 67 may be equally well located in pressure line 25 as indicated in dashed lines in FIG. 1.

When the adjuster control valve 21 is opened the pressure fluid flows directly back to the reservoir 15. However, alternatively, the pressure fluid may be first used to lubricate working parts of the brake.

Figure 3:
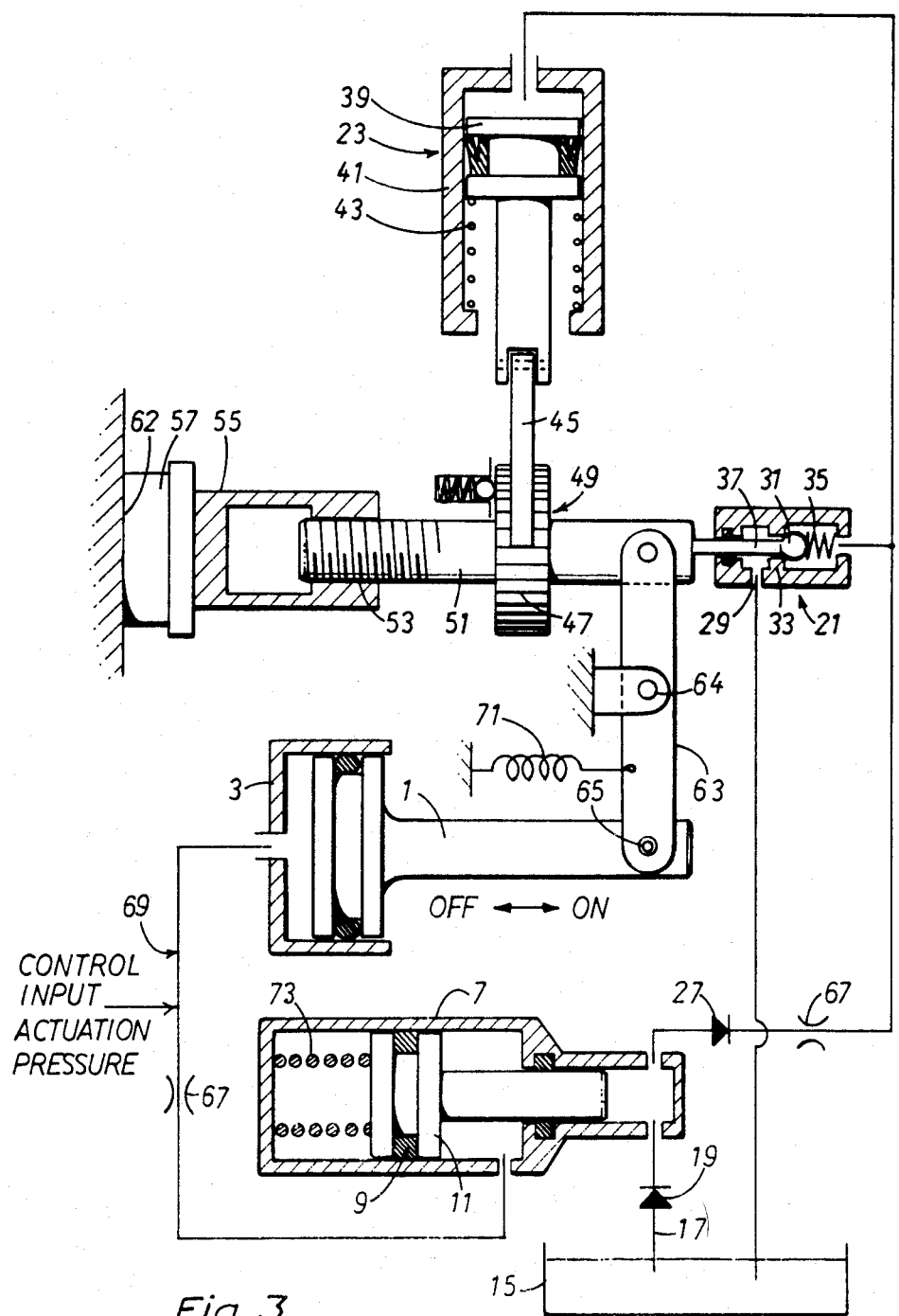
FIG. 3 is a schematic illustration of another embodiment of a brake actuator and adjuster mechanism constructed according to the present invention.
Figure 4:
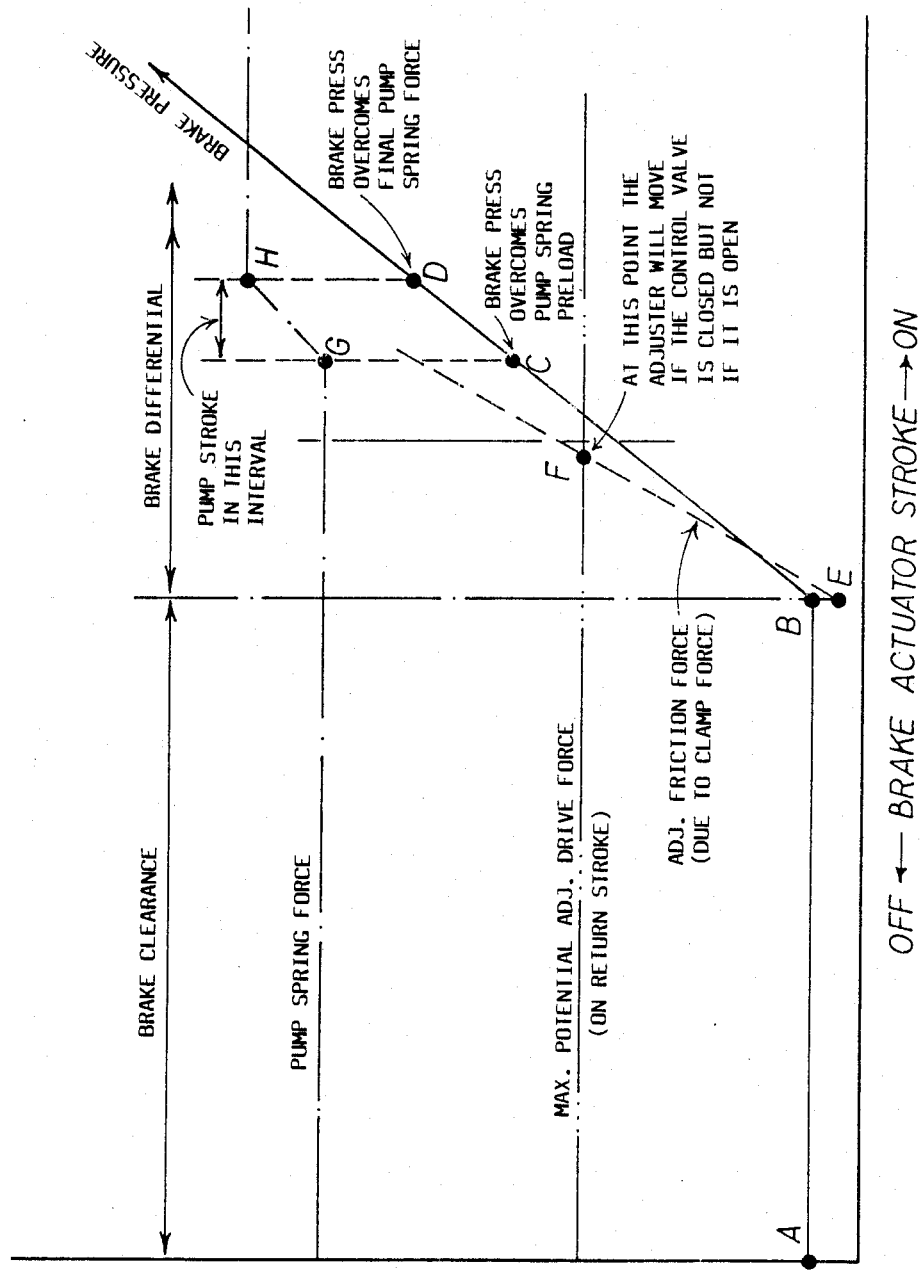
FIG. 4 is a graphical illustration of the operating characteristics of the embodiment of FIG. 3 of the present invention.

In a further embodiment of the present invention illustrated schematically in FIG. 3, with its operating characteristics shown in FIG. 4 the same reference numerals as used in FIG. 1 being used in FIG. 3 for equivalent parts. In the embodiment the brakes are applied by the actuation pressure and a main spring 71 releases the brakes when the actuation pressure is reduced or released. It will thus be appreciated that an increase in actuation pressure (B-C-D) will cause an increase in the brake clamp force resulting in increased frictional forces between the brake lining 57 and braking surface 62 (E-F). In this embodiment the pump 7 is arranged so that the pressure fluid delivery to the adjuster actuator 23 and the adjuster control valve 21 occurs when the actuation pressure is falling—that is the delivery is caused by an expansion of the pump spring 73. The line including points 'G' and 'H' in FIG. 3 shows the pump spring characteristic, the pump spring 73 being fully compressed to the right of point 'H'—corresponding to the brake actuation pressure at point 'D', and expanding up to point 'G'—corresponding to the brake actuation pressure at point 'C'. Thus, the pump spring 73 delivers pressure fluid between points 'H' and 'G'. A brake application when the actuation pressure can overcome the pump spring 73 preload (point C) will thus cause a suction stroke. On the release of the brakes the potential adjuster drive force provided by the pump spring 73 (horizontal line passing through point 'F') is balanced against the adjuster resistance caused by the brake clamp force (E-F). Normally, the adjuster control valve 21 is pushed open by the actuator member 51 before the adjuster resistance (E-F) has fallen below the adjuster drive force. The adjuster drive pressure is thereby dumped before any adjuster movement occurs. Accumulated lining wear causes the brake clamp force to die down earlier on the brake actuator return stroke so that the adjuster drive force can cause an incremental adjustment before the adjuster control valve 21 opens. Repetition of this braking and release restores the normal condition.

In use of the above described embodiments of the present invention, the adjuster operates solely on the release of the brakes so that the maximum available force is available solely for braking.

I claim:

1. A brake actuating and adjuster system comprising a brake actuator member and a pump, means for applying brake actuation pressure to said pump and to said brake actuator member to operate said pump and control the application of a brake, respectively, an adjuster actuator and an adjuster control valve connected to said pump for receiving pressure fluid therefrom upon operation thereof, said adjuster control valve controlling the flow of pressure fluid between exhaust and the connection between said adjuster actuator and said pump, said pressure fluid acting on said control valve to hold it closed, and means responsive to the movement of the brake actuator member to a predetermined release position to open the adjuster control valve against the pressure of said pressure fluid and relieve to exhaust any fluid pressure in the connection between said pump and said adjuster actuator.

2. A system according to claim 1, wherein the brake actuator member releases the brake upon application of brake actuation pressure, the brakes being spring applied.

3. A system according to claim 1, wherein the brake actuator member applies the brake upon application of brake actuation pressure, the brake being released by a spring when the brake actuation pressure is relieved.

4. A system according to either one of claims 2 and 3, wherein the brake actuator member is movable axially by a piston and cylinder arrangement to which brake actuation pressure can be applied.

5. A system according to claim 1, wherein the adjuster control valve has a closure member which is biassed by a spring to a valve closed position, the brake actuator member being arranged to engage and lift the closure member to open the adjuster control valve.

6. A system according to either one of claims 2 and 3, wherein the brake actuator member is coupled to an axially movable and rotatable shaft via a mechanical linkage, said shaft being adjustably connected to a brake shoe and carrying a ratchet wheel which is engaged by a pawl connected to said adjuster actuator.

7. A system according to claim 1, wherein the adjuster actuator is a piston and cylinder arrangement, the piston being movable against the force of a spring under the pressure of the pressure fluid pumped by the pump.

8. A system according to claim 1, wherein the pump comprises a piston axially slidable within a cylindrical cavity, brake actuation pressure being applicable to one side of the piston, to move the piston against a spring, the region of the cylindrical cavity on the other side of the piston being connected both to a reservoir of pressure fluid via a one way valve and to the adjuster control valve and the adjuster actuator via a further one way valve.

9. A system according to either one of claims 2 and 3, wherein brake actuation pressure can be applied hydraulically to the brake actuator member and pump, a flow restrictor being located in the hydraulic line connected to the pump.

10. A system according to either one of claims 2 and 3, wherein a flow restrictor is provided in the pressure line connecting the pump and the adjuster control valve and the adjuster actuator, the flow restrictor being upstream of the adjuster control valve and the adjuster actuator.

* * * * *